United States Patent
Martin et al.

(10) Patent No.: US 11,762,103 B2
(45) Date of Patent: Sep. 19, 2023

(54) DETECTION METHOD OF A WRONG SYNCHRONIZATION OF A RECEIVER WITH A SATELLITE, ASSOCIATED RECEIVER AND COMPUTER PROGRAM PRODUCT

(71) Applicant: THALES, Courbevoie (FR)

(72) Inventors: Nicolas Martin, Valence (FR); Denis Bouvet, Valence (FR); Christian Mehlen, Valence (FR)

(73) Assignee: THALES, Courbevoie (FR)

( * ) Notice: Subject to any disclaimer, the term of this patent is extended or adjusted under 35 U.S.C. 154(b) by 391 days.

(21) Appl. No.: 16/993,006

(22) Filed: Aug. 13, 2020

(65) Prior Publication Data
US 2021/0048536 A1 Feb. 18, 2021

(30) Foreign Application Priority Data
Aug. 14, 2019 (FR) ...................... 19 09209

(51) Int. Cl.
*G01S 19/23* (2010.01)
*G01S 19/30* (2010.01)
(Continued)

(52) U.S. Cl.
CPC .............. *G01S 19/23* (2013.01); *G01S 19/21* (2013.01); *G01S 19/24* (2013.01); *G01S 19/30* (2013.01);
(Continued)

(58) Field of Classification Search
CPC .......... G01S 19/21; G01S 19/24; G01S 19/30; H04B 1/70752
See application file for complete search history.

(56) References Cited

U.S. PATENT DOCUMENTS

2005/0195789 A1* 9/2005 Akopian ............... G01S 19/246
370/342
2007/0274374 A1* 11/2007 Abraham ................ G01S 19/37
375/150
(Continued)

FOREIGN PATENT DOCUMENTS

FR 2974914 A1 11/2012
FR 3043790 A1 5/2017
FR 3047567 A1 8/2017

OTHER PUBLICATIONS

M.S. Braasch et al., GPS receiver architectures and measurements, Proceedings of the IEEE, vol. 87(1), p. 48-64, Jan. 1999 (Year: 1999).*

(Continued)

Primary Examiner — Bernarr E Gregory
Assistant Examiner — Fred H Mull
(74) Attorney, Agent, or Firm — ArentFox Schiff LLP

(57) ABSTRACT

This detection method is carried out after a phase for acquiring a navigation signal during a convergence phase and comprises at least one of the following steps: —determining a plurality of pilot channel periodic correlations and a plurality of data channel periodic correlations, and determining a first value as a function of these periodic correlations; —determining a plurality of pilot channel partial correlations, and determining a second value as a function of these partial correlations; —determining a plurality of shifted pilot channel correlations, and determining a third value as a function of these shifted pilot channel correlations. The convergence phase further comprises the step for determining a wrong synchronization when at least one of the first value, the second value, and the third value exceeds a predetermined threshold.

11 Claims, 3 Drawing Sheets

(51) Int. Cl.
    *G01S 19/39*     (2010.01)
    *G01S 19/24*     (2010.01)
    *H04B 1/7075*     (2011.01)
    *G01S 19/21*     (2010.01)

(52) U.S. Cl.
    CPC .......... *G01S 19/39* (2013.01); *H04B 1/70752* (2013.01)

(56) References Cited

U.S. PATENT DOCUMENTS

| | | | |
|---|---|---|---|
| 2011/0103432 A1 | 5/2011 | Tangudu et al. | |
| 2012/0281735 A1* | 11/2012 | Martin | G01S 19/30 375/150 |
| 2017/0227652 A1* | 8/2017 | Martin | G01S 19/30 |

OTHER PUBLICATIONS

B.A. Siddiqui et al., Joint Data-Pilot Acquisition and Tracking of Galileo E1 Open Service Signal, Ubiquitous Positioning Indoor Navigation and Location Based Service (UPINLBS), IEEE, 7 pages, 2010 (Year: 2010).*
Y. Zaixiu et al., Chinese Journal of Aeronautics, vol. 26(3), p. 751-765, 2013 (Year: 2013).*
Shanmugam, S., et al.,"GPS L5 Cross-correlation Detection in WAAS G-III Reference Receiver", GNSS 2012—Proceedings of the 25th International Technical Meetings of the Institute of Navigation (ion gnss 2012), Institute of Navigation, XP056008450, pp. 1369-1378, (Sep. 21, 2012).
French Search Report issued by the French Patent Office in corresponding French Patent Application No. 1909209, dated Apr. 8, 2020.
Bouvet, D. et al., "Proposal of Acceptable Means of BOC (1,1) False Locks Mitigation for DFMC SBAS Equipment", GNSS 2018—Proceedings of the 31st International Technical Meeting of the Satellite Division of the Institute of Navigation, XP056014988, pp. 1661-1674, (Sep. 28, 2018).

* cited by examiner

DETECTION METHOD OF A WRONG SYNCHRONIZATION OF A RECEIVER WITH A SATELLITE, ASSOCIATED RECEIVER AND COMPUTER PROGRAM PRODUCT

CROSS-REFERENCE TO RELATED APPLICATIONS

This application claims priority to French Patent Application No. 19 09209, filed on Aug. 14, 2019. The disclosure of the priority application is incorporated in its entirety herein by reference.

FIELD OF THE INVENTION

The present invention relates to a method for determining a wrong synchronization of a receiver with a satellite.

The present invention also relates to an associated receiver and computer program product.

The method according to the invention is carried out after a phase for acquiring a navigation signal from a satellite.

Such a satellite is part of a global navigation satellite system (GNSS).

BACKGROUND OF THE INVENTION

In general, a GNSS system is made up of a plurality of satellites allowing a mobile receiver to determine its position in a land-based plane of reference, its speed and the time.

There are currently several GNSS systems, which in particular include the GPS system, the GLONASS system and the GALILEO system, which is expected to be brought into operational use soon.

The satellites of such a GNSS system are able to emit electromagnetic signals in particular comprising navigation information.

Each item of navigation information generally comprises data relative to the transmission time by the satellite of the corresponding signal and the current position of the satellite. In particular, the data relative to the current position of the satellite generally contain the almanac providing a rough position of the satellite and the ephemerids giving the exact current position of the satellite.

The item of navigation information is carried by a carrier wave and modulated by a spreading code specific to each satellite. Thus, the signals are transmitted by the satellites using a spread spectrum technique.

The receiver is able to receive the signals emitted by the satellites and to extract the navigation information therefrom in particular to determine the distance to the satellite that transmitted the corresponding signal. This distance, also called pseudo-distance, is determined by analyzing the propagation delay of the corresponding signal.

To determine its position, its speed and the time, the receiver performs a digital processing of the navigation information from at least three different satellites.

In practice, to have a more precise position, the receiver needs navigation information from at least four different satellites.

More specifically, to acquire the navigation information from a given satellite, the receiver implements two phases processing the signals from this satellite.

During an initial phase, called acquisition phase in the state of the art, the receiver generates a local signal in particular containing a local spreading code showing the image of the spreading code of the satellite.

Since the receiver does not initially know its position, the local signal is not synchronized with the received signal. This in particular means that the local signal is carrier frequency-shifted from the received signal by a value called Doppler value, and the spreading code of the received signal is delayed from the local spreading code by a value called delay value.

The receiver then searches for a peak in the correlations between the local signal and the received signal by trying different Doppler and delay values.

When a peak is detected, the receiver determines the Doppler and delay values corresponding to this peak and, from these values, launches a following phase, called tracking phase in the state of the art.

During the tracking phase, the receiver regularly updates the Doppler and delay values, and extracts the item of navigation information from the signal transmitted by the satellite in particular using the local spreading code and the determined Doppler and delay values.

At the end of the acquisition phase, the receiver is considered to have synchronized itself with the satellite, or has "locked on" to the satellite.

This in particular means that the receiver was able to find the Doppler and delay values relative to this satellite to initiate the tracking phase.

Sometimes, the receiver synchronizes its local signal corresponding to the desired satellite with the signal received from another satellite, which leads to an incorrect distance measurement, and therefore potentially an inaccurate position.

In this case, this is a wrong synchronization, or a false "lock".

This for example occurs when the correlation between the local signal and the signal received from the sought satellite provides less energy than the correlation with the signal received from another satellite, due to a large received power deviation.

Different methods exist in the state of the art making it possible to avoid such a wrong synchronization.

Thus, one method, used conventionally, consists of verifying the consistency between the position of the satellite computed from ephemerids contained in the item of navigation information and that computed from the almanac, containing the identifiers of the satellites, unlike the ephemerids. An inconsistency between these values therefore indicates a wrong synchronization.

However, this method is not fully satisfactory. In particular, it requires collecting all of the ephemerids contained in the navigation information, which is relatively time-consuming. In practice, this may take up to two minutes.

One can then see that this is detrimental to the operation of the receiver, in particular after the satellite is hidden and a re-acquisition occurs, and does not make it possible to ensure continuous service.

Also known is a method for detecting a wrong synchronization described in document FR 3,043,790 that uses the algebraic properties of spreading codes. This then makes the implementation of this method dependent on the spreading codes used.

Also known is a method for detecting a wrong synchronization described in document FR 3,047,567 that consists of comparing the power of the signals received over several correlation paths.

SUMMARY OF THE INVENTION

The present invention aims to improve the methods, and in particular to detect a wrong synchronization quickly, effectively and independently of the spreading codes used.

To that end, the invention relates to a method for determining a wrong synchronization of a receiver with a satellite during a phase for acquiring a navigation signal coming from this satellite, the satellite belonging to a global navigation satellite system;

the navigation signal comprising a data channel including an item of navigation information modulated by a data spreading code specific to this satellite and carried by a carrier wave, and a pilot channel including a pilot spreading code specific to this satellite and carried by a carrier wave;

during the acquisition phase, the receiver being able to receive the navigation signal, called received signal, transmitted by the satellite, to generate a local data signal including a local image of the data spreading code and a local image of the carrier wave, and to generate a local pilot signal including a local image of the pilot spreading code and the local image of the carrier wave;

the method being implemented after the acquisition phase during a convergence phase and comprising at least one of the following steps:

determining a plurality of periodic pilot channel correlations each corresponding to a periodic correlation on a reference interval of duration equal to a reference value between the received signal and the local pilot signal, and a plurality of periodic data channel correlations each corresponding to a periodic correlation on one of the reference intervals between the received signal and the local data signal, and determining a first value as a function of these periodic correlations;

determining a plurality of partial pilot channel correlations each corresponding to a periodic correlation on an interval of duration equal to a fraction of the reference value between the received signal and the local pilot signal, and determining a second value as a function of these partial correlations;

determining a plurality of shifted pilot channel correlations each corresponding to a shifted correlation on one of the reference intervals between the received signal and a shifted local signal corresponding to the local pilot signal in which the local image of the pilot spreading code is shifted by an integer number of reference units, and determining a third value as a function of these shifted pilot channel correlations;

the convergence phase further comprising the following step:

determining a wrong synchronization when at least one of the values among the first value, the second value and the third value, when such a value is determined, exceeds a predetermined threshold.

According to other advantageous aspects of the invention, the detection method comprises one or more of the following features, considered alone or according to all technically possible combinations:

the first value is determined based on covariances between the periodic pilot channel correlations and the periodic data channel correlations;

the first value is determined as follows:

$$v_1 = \frac{(P_{pp} - P_{dd})^2 + 4P_{pd}^2}{(P_{ref}/N)^2}\sigma^2,$$

where $v_1$ is the first value;

N is the number of pilot channel periodic correlations equal to the number of data channel periodic correlations;

$P_{pp}$ is the covariance of the pilot channel periodic correlations;

$P_{dd}$ is the covariance of the data channel periodic correlations;

$P_{pd}$ is the covariance of the pilot channel periodic correlations and the data channel periodic correlations;

$P_{ref}$ is a reference power determined as a function of the pilot channel periodic correlations; and $\sigma^2$ is the variance of the noise of $(P_{pp}-P_{dd})$ and $2P_{pd}$;

during the step for determining a plurality of pilot channel partial correlations, P types of partial correlations are determined, a partial correlation of a given type being determined on a predetermined fraction of one of the reference intervals;

the second value is determined as follows:

$$v_2 = \frac{\text{Sum}_P}{P_{ref}}\sigma^2, \text{ where}$$

$$\text{Sum}_P = \sum_{p=1,\ldots,P}(I_{pp}(p) - M)^2,$$

$$M = \frac{1}{P}\sum_{p=1,\ldots,P}I_{pp}(p),$$

$$I_{pp}(p) = \frac{1}{N}\sum_{m=1,\ldots,N}\text{Re}[Z_{pp}(m, p)]\cdot\epsilon(m),$$

where $v_2$ is the second value;

N is the number of partial correlations;

$\epsilon(m)$ is the secondary code of the pilot channel 1 or −1;

$Z_{pp}$ (m, p) is a partial correlation of a type p, the number p being inclusively between 1 and P;

$P_{ref}$ is a reference power determined as a function of the pilot channel periodic correlations;

Re[X] is the real part of a complex number X; and $\sigma^2$ is the variance of the noise of each of the functions $I_{pp}$(p);

the second value is further determined as a function of a plurality of data channel partial correlations each corresponding to a periodic correlation over an interval of duration equal to a fraction of the reference value between the received signal and the local data signal;

each shifted pilot channel correlation is determined by using the local image of the pilot spreading code advanced or delayed by one or two reference units;

the third value is determined as follows:

$$v_3 = \frac{\sum_{k\in E}(I_{p+k}^2)}{P_{ref}}\sigma^2, \text{ where}$$

$$I_{p+k}(p) = \frac{1}{N}\sum_{m=1,\ldots,N}\text{Re}[Z_{pd}(m, kT_{chip})]\cdot\epsilon(m),$$

where
v₃ is the third voltage,
N is the number of shifted correlations;
ε(m) is the secondary code of the pilot channel, its values being equal to 1 or −1;
E is a subset of the set where {−K, . . . , −1, 1, . . . , K}, is the maximum number of shifts used in one direction;
$Z_{p,d}(m, kT_{chip})$ is a correlation advanced by k reference units when k>0 and delayed by k reference units when k<0;
$P_{ref}$ is a reference power determined as a function of the pilot channel periodic correlations; and
$\sigma^2$ is the variance of the noise of each of the functions $I_{p+k}(p)$;
at least two steps among the steps for determining a plurality of pilot channel periodic correlations, determining a plurality of pilot channel partial correlations and determining a plurality of shifted pilot channel correlations are carried out;
advantageously, the method comprising carrying out all of said steps.

The invention also relates to a computer program product including software instructions which, when implemented by computer equipment, carry out a method as defined above.

The invention also relates to a receiver carrying out the method as previously defined.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
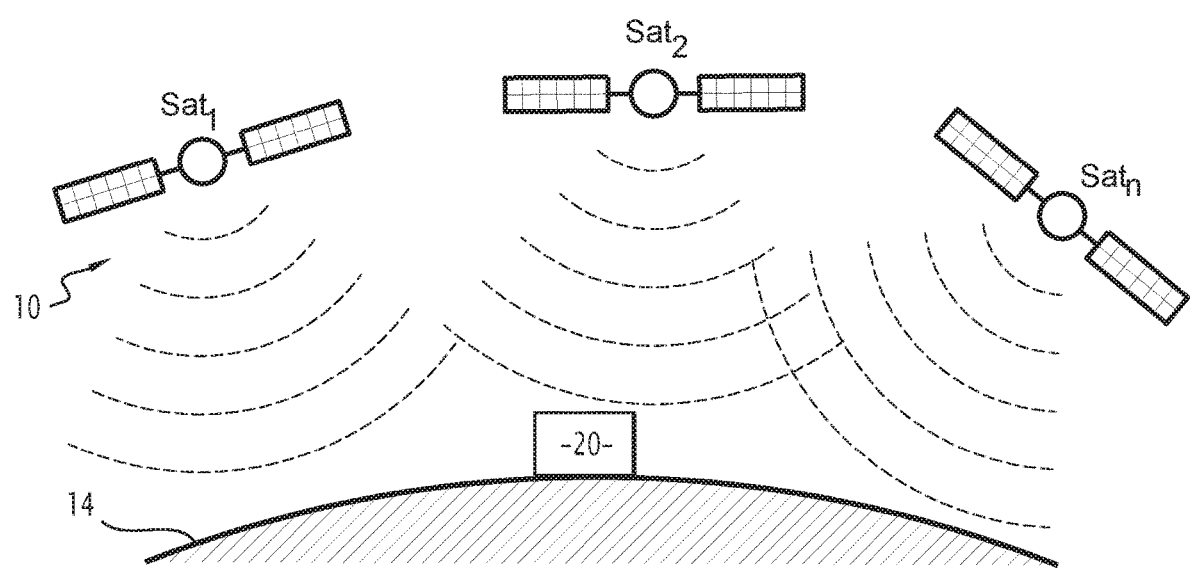
FIG. 1 is a schematic view of a global navigation satellite system and a receiver according to the invention.

FIG. 1 shows a global navigation satellite system (GNSS) 10. This global system 10 is for example the GALILEO system.

In reference to this FIG. 1, the positioning system 10 includes a plurality of satellites $Sat_n$ positioned in different orbits around the Earth for which the positioning system 10 is established.

The total number of satellites $Sat_n$ is for example equal to 30.

The index n corresponds to an identifier of each satellite $Sat_n$, and for example varies between 1 and 30.

Each satellite $Sat_n$ is able to transmit electromagnetic signals S toward part of the Earth's surface 14 that it is flying over.

In particular, the satellites $Sat_n$ are arranged such that at least four satellites $Sat_n$ are able to transmit electromagnetic navigation signals S toward substantially each point of the Earth's surface 14.

The current position of each satellite $Sat_n$ is characterized by the ephemerids relative to this satellite or by the almanac thereof.

As is known in itself, the ephemerids make it possible to determine the exact position of the satellite $Sat_n$, while the almanac provides a rough position.

Each signal S transmitted by each of the satellites $Sat_n$ comprises a data channel including an item of navigation information.

In particular, such a signal S comprises an item of navigation information modulated by a data spreading code $C_n^d(\phi_c)$ specific to the satellite $Sat_n$ having transmitted this signal.

The modulated navigation information is carried by a carrier wave $\exp(-j\phi_p)$ using a technique known in itself.

Each signal S transmitted by each of the satellites $Sat_n$ further comprises a pilot channel including a pilot spreading code $C_n^p(\phi_c)$ specific to the satellite $Sat_n$ having transmitted this signal.

Each item of navigation information in particular comprises the transmission time of the corresponding signal, the ephemerids and the almanac of the satellite $Sat_n$ at the time of transmission of the signal S.

Each data $C_n^d(\phi_c)$ or pilot $C_n^p(\phi_c)$ spreading code has a binary code of the pseudorandom noise (PRN) type.

Each data $C_n^d(\phi_c)$ or pilot $C_n^p(\phi_c)$ spreading code is a periodic code with a code period denoted $L_c$ and expressed as a whole number of reference units.

The reference unit is for example a chip whose duration is denoted $T_{chip}$ and expressed in seconds.

A "chip" refers to a reference unit corresponding to a slot of a code of the pseudorandom type.

Over the duration of each reference unit, or chip, the spreading code assumes a constant value equal either to +1 or to −1.

The data $C_n^d(\phi_c)$ or pilot $C_n^p(\phi_c)$ spreading codes are characterized by their autocorrelation functions $R_{n,n}$ respectively determined using the following formulas:

$$R_{n,n}(\tau) = \frac{1}{L_c} \int_0^{L_c} C_n^d(u) C_n^d(u+\tau) du,$$

$$R_{n,n}(\tau) = \frac{1}{L_c} \int_0^{L_c} C_n^p(u) C_n^p(u+\tau) du.$$

In particular, at point $\tau=0$, called reference point, the autocorrelation function $R_{n,n}$ assumes its maximum value $V_{max}$. For $\tau \leq -T_{chip}$ and $\tau \geq T_{chip}$, the autocorrelation function $R_{n,n}$ assumes very small values V in view of $V_{max}$, i.e., $V \ll V_{max}$.

The data $C_n^d(\phi_c)$ or pilot $C_n^p(\phi_c)$ spreading codes corresponding to the different satellites $Sat_n$ are quasi-perpendicular. In other words, the inter-correlation function $R_{n,j}$ between each pair of different spreading codes $C_n^d(\phi_c)$ and $C_i^d(\phi_c)$ or $C_n^p(\phi_c)$ and $C_i^p(\phi_c)$ assumes negligible values V in view of $V_{max}$, the inter-correlation functions $R_{n,j}$ for these codes respectively being determined by the following formulas:

$$R_{n,j}(\tau) = \frac{1}{L_c} \int_0^{L_c} C_n^d(u) C_j^d(u+\tau) du,$$

$$R_{n,j}(\tau) = \frac{1}{L_c} \int_0^{L_c} C_n^p(u) C_j^p(u+\tau) du.$$

Each data spreading code $C_n^d(\phi_c)$ makes it possible to modulate the navigation information transmitted by the satellite $Sat_n$.

Each signal from a satellite $Sat_n$ is demodulated using a spreading code that is the local image $C_n^d(\phi_{cloc})$ of the data spreading code $C_n^d(\phi_c)$ or the local image $C_n^P(\phi_{cloc})$ of the pilot spreading code $C_n^P(\phi_c)$ corresponding to this satellite.

These signals are demodulated using different techniques for transmitting complex signals known in themselves.

According to the "CDMA (Code Division Multiple Access) Multiplexing" technique, each complex signal is sent via two carrier waves at the same frequency and synchronously. In this case, the composite spreading code corresponds to the sum of the corresponding data $C_n^d(\phi_c)$ and pilot $C_n^P(\phi_c)$ spreading codes.

According to the example embodiment described below, the positioning system 10 is the GPS system (Global Positioning System).

Of course, other example embodiments are also possible.

The signals S transmitted by at least some of the satellites $Sat_n$ are received by a receiver 20.

The receiver 20 is for example a portable electronic device.

The receiver 20 is for example able to move on or near the Earth's surface 14 with a variable speed.

The receiver 20 is able to receive signals S from satellites $Sat_n$, and to extract the navigation information from these signals S to deduce its current position, its current speed and the time, as will be explained later.

Figure 2:
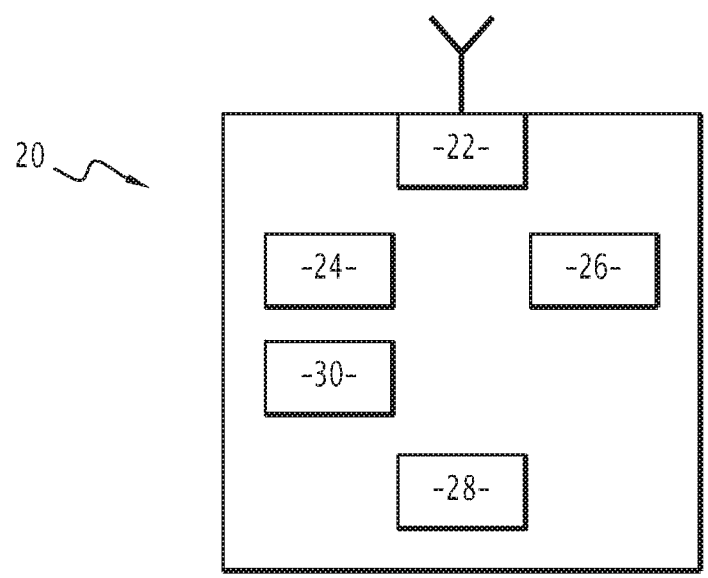
FIG. 2 is a detailed view of the receiver of FIG. 1.

The receiver 20 is illustrated in more detail in FIG. 2.

Thus, in reference to this FIG. 2, the receiver 20 includes an antenna 22, an acquisition module 24, a tracking module 26, a detection module 28, a control module 30 and hardware resources.

The modules 24, 26, 28 and 30 for example assume the form of software programs that are implemented by the hardware resources provided to that end, such as a processor, random-access memory, read-only memory, etc. The hardware resources are for example battery-powered.

In particular, the read-only memory of the receiver 20 is able to store images of the data $C_n^d(\phi_c)$, and optionally pilot $C_n^P(\phi_c)$, spreading codes of each satellite $Sat_n$.

The antenna 22 is able to receive electromagnetic signals $S_r$ corresponding to the signals S transmitted by the satellites $Sat_n$ when the latter are in range of its visibility.

The control module 30 is able to control the operation of the modules 24, 26 and 28.

The acquisition module 24 is able to carry out an acquisition phase for the signals $S_r$ using techniques known in themselves.

The tracking module 26 is able to carry out a tracking phase for the signals $S_r$ using techniques known in themselves.

Lastly, the detection module 28 is able to carry out a convergence phase, which is transitional between the acquisition phase and the tracking phase. The convergence phase in particular comprises a method for detecting a wrong synchronization according to the invention. This method will be described in detail below.

The operation of the receiver 20 will now be explained.

Each time the receiver 20 is started, the control module 30 initiates a plurality of acquisition channels for all of the satellites $Sat_n$. Each of these channels makes it possible to acquire the item of navigation information from the satellite $Sat_n$ with which it is associated, when this satellite $Sat_n$ is in the visibility range of the antenna 22.

The operation of the receiver 20 on each acquisition channel is substantially similar. Thus, only the operation of the receiver 20 on one channel will be explained below.

This channel is for example associated with the satellite $Sat_n$, hereinafter called sought satellite. It is further assumed that the satellite $Sat_n$ is situated in the visibility range of the antenna 22 and that this satellite is able to transmit navigation signals.

The receiver 20 generates a local data signal $S_{loc}^d$ including a local carrier wave $\exp(-j\varphi_{ploc})$ and a local data spreading code $C_n^d(\phi_{cloc})$ corresponding to a local image of the data spreading code $C_n^d(\phi_c)$ of the sought satellite.

The local data signal $S_{loc}^d$ as a function of time t is then written in the following form:

$$S_{loc}^d(t) = \exp(-j\phi_{ploc}(t)) \cdot C_n^d(\phi_{cloc}(t)),$$

with $j^2 = -1$.

The receiver 20 further generates a local pilot signal $S_{loc}^P$ including a local carrier wave $\exp(-j\phi_{ploc})$ and a local pilot spreading code $C_n^P(\phi_{cloc})$ corresponding to a local image of the pilot spreading code $C_n^P(\phi_c)$ of the sought satellite.

The local pilot signal $S_{loc}^P$ as a function of time t is then written in the following form:

$$S_{loc}^P(t) = \exp(-j\phi_{ploc}(t)) \cdot C_n^P(\phi_{cloc}(t)),$$

with $j^2 = -1$.

Then, the control module 30 launches the execution of the acquisition phase, which is then carried out by the acquisition module 24.

In particular, during the acquisition phase, the acquisition module 24 determines a Doppler value and a delay value of the received signal $S_r$ relative to the local data $S_{loc}^d$ or pilot $S_{loc}^P$ signal.

The Doppler value corresponds to the frequency shift of the local carrier wave $\exp(-j\phi_{ploc})$ relative to the carrier wave $\exp(-j\phi_p)$ of the received signal $S_r$.

The delay value corresponds to the delay of the pilot spreading code $C_n^P(\phi_c)$ of this received signal relative to the local pilot spreading code $C_n^P(\phi_{cloc})$.

The delay values are determined using known techniques that in particular comprise computing three types of correlations.

A first type of correlation, called periodic correlation, consists of computing correlations between the received signal $S_r$ and the local data $S_{loc}^d$ or pilot $S_{loc}^P$ signal.

A second type of correlation, called advance correlation, consists of computing correlations between the received signal $S_r$ and a signal corresponding to the local data $S_{loc}^d$ or pilot $S_{loc}^P$ signal in which the local spreading code $C_n^d(\phi_{cloc}+d)$ or $C_n^P(\phi_{cloc}+d)$ is shifted forward by a value d comprised between 0 and $T_{chip}$.

A third type of correlation, called delay correlation, consists of computing correlations between the received signal $S_r$ and a signal corresponding to the local data $S_{loc}^d$ or pilot $S_{loc}^P$ signal in which the local spreading code $C_n^d(\phi_{cloc}-d)$ or $C_n^P(\phi_{cloc}-d)$ is delay-shifted by the same value d.

At the end of the acquisition phase, the receiver 20 synchronizes the local data $S_{loc}^d$ or pilot $S_{loc}^P$ signal with the signal S transmitted by the sought satellite $Sat_n$ by using the determined Doppler and delay values.

Then, the control module 30 launches the execution of the convergence phase, and in particular of the method for detecting a wrong synchronization. This method is in particular carried out by the detection module 28.

The convergence phase enslaves the delay value of the local spreading code $C_n^d(\phi_{cloc})$ or $C_n^P(\phi_{cloc})$ and the Doppler value of the local carrier wave $\exp(-j\phi_{ploc})$, on the received signal $S_r$, using code and carrier tracking loops, in particular owing to the three aforementioned types of correlation.

This transitional phase makes it possible to cause the local spreading code $C_n^d(\phi_{cloc})$ or $C_n^P(\phi_{cloc})$ and the local carrier wave $\exp(-j\phi_{ploc})$ to coincide precisely with the spreading code $C_n^d(\phi_c)$ or $C_n^P(\phi_c)$ and the carrier wave $\exp(-j\phi_p)$ of the received satellite signal $S_r$.

Furthermore, the detection method carried out during this phase makes it possible to detect a wrong synchronization of the corresponding acquisition channel with a satellite $Sat_p$ other than the sought satellite $Sat_n$.

In particular, when a wrong synchronization occurs, the Doppler and delay values determined by the acquisition module 24 correspond to the signal S transmitted by a satellite $Sat_p$ other than the sought satellite $Sat_n$.

One can then see that in this case, the signals $S_{loc}^d$ or $S_{loc}^P$ and S cannot be synchronized correctly. This is therefore a wrong synchronization and a false lock.

When the detection module 28 detects a wrong synchronization, the control module 30 launches the acquisition phase again.

When the detection module 28 does not detect a wrong synchronization, the control module 30 launches the tracking phase, which is then carried out by the tracking module 26.

In particular, during the tracking phase, the tracking module 26 regularly updates the Doppler and delay values, which allows it to demodulate the received signal $S_r$ and extract the corresponding item of navigation information therefrom. It subsequently sends this information to the control module 30.

Lastly, the control module 30 consolidates all of the information acquired by the set of acquisition channels and deduces the position of the receiver 20, its speed and the time therefrom.

Figure 3:
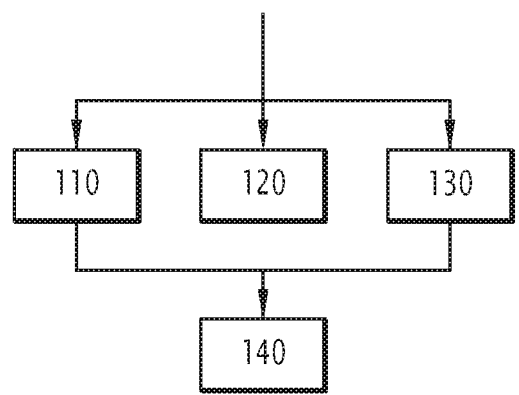
FIG. 3 is a flowchart of a detection method carried out by the receiver of FIG. 2.

The method for detecting a wrong synchronization will now be explained in detail in reference to FIG. 3, showing a flowchart of its steps.

In particular, this method comprises steps 110, 120 and 130 each corresponding to a criterion for a wrong synchronization. These criteria are next compared with predetermined thresholds during step 140, which then makes it possible to conclude whether a wrong synchronization has occurred.

Steps 110 to 130 are independent of one another and can therefore be implemented in parallel or consecutively. In one particular embodiment, at least some of these steps are implemented by using the results of previous calculations in particular done during the acquisition phase.

Furthermore, during the embodiment described below, the three steps 110 to 130 are implemented and the three criteria are therefore compared with the corresponding thresholds during step 140.

According to another exemplary embodiment, only two steps among the steps 110 to 130 are implemented and the two criteria are therefore compared with the corresponding thresholds during step 140.

According to still another exemplary embodiment, only one step among the steps 110 to 130 is implemented and the obtained criterion is therefore compared with the corresponding threshold during step 140.

Before the implementation of steps 110 to 140, the detection module 28 determines a plurality of correlation intervals that are for example the same for all of these steps.

Each correlation interval is thus called reference interval and will be identified hereinafter by the index m varying between 1 and N, N being the total number of reference intervals over the duration of the convergence phase.

The reference intervals for example have substantially the same duration T, which is for example equal to 20 ms. This duration T will be called reference value hereinafter.

During step 110, the detection module 28 determines a first value $v_1$ corresponding to the anisotropy of the covariance matrix between the pilot and data channels.

In particular, during this step 110, the detection module 28 first determines a plurality of pilot channel periodic correlations $Z_p(m)$ and a plurality of data channel periodic correlations $Z_d$ @TO.

These periodic correlations $Z_p(m)$ and $Z_d$ @TO are determined as follows:

$$Z_p(m) = \frac{1}{T}\int_{[mT,(m+1)T]} S_{loc}^{p^*}(t) \cdot S_r(t),$$

$$Z_d(m) = \frac{1}{T}\int_{[mT,(m+1)T]} S_{loc}^{d^*}(t) \cdot S_r(t),$$

where $S_{loc}^p$, $S_{loc}^d$ and $S_r$ respectively correspond to the local pilot signal, local data signal and received signal, as previously explained; and X* means conjugate of the complex number X.

Then, the detection module 28 determines a covariance $P_{pp}$ of the pilot channel periodic correlations $Z_p(m)$, a covariance $P_{dd}$ of the data channel periodic correlations, a covariance $P_{pd}$ of the pilot channel periodic correlations and data channel periodic correlations and a reference power $P_{ref}$.

These values are defined as follows:

$$P_{pp} = \frac{1}{N}\sum_{m=1,\ldots,N} Z_p(m) \times Z_p(m)^* = \frac{1}{N}\sum_{m=1,\ldots,N} \|Z_p(m)\|^2,$$

$$P_{dd} = \frac{1}{N}\sum_{m=1,\ldots,N} Z_d(m) \times Z_d(m)^* = \frac{1}{N}\sum_{m=1,\ldots,N} \|Z_d(m)\|^2,$$

$$P_{pd} = \text{Re}\left[\frac{1}{N}\sum_{m=1,\ldots,N} Z_p(m) \times Z_p(m)^*\right],$$

$$P_{ref} = \left\|\frac{1}{N}\sum_m Z_p(m) \cdot \exp(-j\theta(m)) \cdot \epsilon(m)\right\|^2,$$

where

Re[X] is the real part of the complex number X;

$\epsilon(m) = \pm 1$ is the secondary code of the pilot channel; and $\theta(m)$ is the estimate of the phase of the complex number $Z_p(m)$ done owing to the carrier phase loop.

Lastly, the detection module 28 determines the first value $v_1$ as follows:

$$v_1 = \frac{(P_{pp} - P_{dd})^2 + 4P_{pd}^2}{\left(\frac{P_{ref}}{N}\right)^2}\sigma^2,$$

where $\sigma^2$ is the variance of the noise of $(P_{pp} - P_{dd})$ and $2P_{pd}$.

The first value $v_1$ follows a law of $X_2$ with two degrees of freedom.

During step 120, the detection module 28 determines a second value $v_2$ by using a plurality of pilot channel partial correlations $Z_{pp}(m, p)$.

Each partial pilot channel correlation $Z_{pp}(m, p)$ corresponds to a periodic correlation on an integration interval of length equal to a fraction of the reference value T between the received signal $S_r$ and the local pilot signal $S_{loc}^p$.

In the notation $Z_{pp}(m, p)$, the number p determines the type of the partial correlation. The number p varies between 1 and P, the number P referring to the number of fractions of the reference interval, which, in the described example, is equal to 4. Furthermore, these fractions all have a same duration, which is then equal to T/4.

Thus, each pilot channel partial correlation $Z_{pp}(m, p)$ is determined as follows:

$$Z_{pp}(m, p) = \frac{1}{T} \int_{[mT+(p-1)T/4, mT+pT/4]} S_{loc}^{p^*}(t) \cdot S_r(t) dt.$$

Lastly, the second value $v_2$ is determined by using the following relationship:

$$v_2 = \frac{\text{Sum}_P}{P_{ref}} \sigma^2, \text{ where}$$

$$\text{Sum}_P = (I_{pp}(1) - M)^2 + (I_{pp}(2) - M)^2 + (I_{pp}(3) - M)^2 + (I_{pp}(4) - M)^2,$$

$$M = \frac{1}{4} \sum_{p=1,\ldots,4} I_{pp}(p),$$

$$I_{pp}(p) = \frac{1}{N} \sum_{m=1,\ldots,N} \text{Re}[Z_{pp}(m, p)] \cdot \epsilon(m),$$

and
where
the values $\epsilon(m)$ and $P_{ref}$ are previously defined; and
$\sigma^2$ is the variance of the noise of each of the functions $I_{pp}(p)$.

The second value $v_2$ follows a law of $X_2$ with three degrees of freedom.

In a variant, it is possible to determine the second value $v_2$ by also using data channel partial correlations that are determined similarly to that used to determine the pilot channel partial correlations.

In this case, the second value $v_2$ is determined as follows:

$$v_2 = \frac{\text{Sum}_P + \text{Sum}_d}{P_{ref}},$$

where the value $\text{Sum}_d$ is determined similarly to that of the value $\text{Sum}_p$ but using data channel partial correlations.

During step 130, the detection module determines a third value $v_3$ as a function of a plurality of shifted pilot channel correlations $Z_{pd}(m, \tau)$.

In particular, each shifted pilot channel correlation $Z_{Pd}(m, \tau)$ corresponds to a shifted correlation between the received signal $S_r$ and a shifted local signal $S_{loc}^{dp}$, corresponding to the local pilot signal $S_{loc}^p$ in which the local image of the pilot spreading code $C_n^p(\phi_{cloc})$ is shifted by an integer number of chips.

Thus, each shifted pilot channel correlation $Z_{pd}(m, \tau)$ is determined as follows:

$$Z_{pd}(m, \tau) = \frac{1}{T} \int_{[mT,(m+1)T]} S_{loc}^{pd^*}(t, \tau) \cdot S_r(t), \text{ where}$$

$$S_{loc}^{pd}(t, \tau) = \exp(-j\phi_{ploc}(t)) \cdot C_n^p(\phi_{cloc}(t) + \tau),$$

with $j^2 = -1$ and $\tau = kT_{chip}$, where the number k varies between $-K$ and K and is different from 0, the number K indicating the maximum number of shifts used in one direction.

In the described example, four types of shifted correlations respectively corresponding to $k=+2, +1, -1$ and $-2$ are determined. These correlations are said to be very advanced or very delayed based on the sign of k.

According to other exemplary embodiments, only very advanced correlations or very delayed correlations are used.

The third value $v_3$ is determined as follows:

$$v_3 = \frac{I_{p+1}^2 + I_{p+2}^2 + I_{p-1}^2 + I_{p-2}^2}{P_{ref}} \sigma^2, \text{ where}$$

$$I_{p+k}(p) = \frac{1}{N} \sum_{m=1,\ldots,N} \text{Re}[Z_{pd}(m, kT_{chip})] \cdot \epsilon(m),$$

where
the values $\epsilon(m)$ and $P_{ref}$ are previously defined; and
$\sigma^2$ is the variance of the noise of each of the functions $I_{p+k}(p)$.

The third value $v_3$ follows a law of $X_2$ with four degrees of freedom.

In a variant, like in the preceding case, it is possible to use shifted data channel correlations. In this case, the values $I_{p+k}(p)$ for the shifted data channel correlations will be determined similarly to that used in order to determine these values for the shifted pilot channel correlations.

During step 140, the detection module 28 analyzes the values $v_1$, $v_2$ and $v_3$ to detect a wrong synchronization.

In particular, when at least one of these values $v_1$, $v_2$ and $v_3$ exceeds a predetermined threshold for this value, the detection module 28 detects a wrong synchronization.

One can then see that the present invention has a certain number of advantages.

Indeed, the invention makes it possible to detect a synchronization phase with a satellite independently of the type of spreading codes used.

This detection is done with a high likelihood, which makes the invention particularly effective.

Additionally, the invention has particular advantages when the global system 10 is the GALILEO system, and in particular when the receiver according to the invention is used to receive so-called "open" signals from the band L1.

It is known in this case that the used data or pilot spreading codes are periodic at 4 milliseconds.

Thus, there is no need to recalculate the partial correlations during step 120 when the number P is equal to 4, that is to say when the partial correlations are calculated over a quarter of the reference interval, or 1 millisecond, since these correlations have already been calculated over time intervals of 1 millisecond, corresponding to an integration time commonly used in the satellite channels of the receivers.

Lastly, it has been observed that the data or pilot spreading codes of said signals have particular properties. In particular, their autocorrelations are nil or quasi-nil at −2 chip, −1 chip, +1 chip and +2 chip around the main autocorrelation peak. This then makes the third value $v_3$ particularly representative of a false lock when K=2.

The invention claimed is:

1. A method for determining a wrong synchronization of a receiver with a satellite during an acquisition phase for acquiring a navigation signal coming from the satellite, the satellite belonging to a global navigation satellite system;

the navigation signal comprising a data channel including an item of navigation information modulated by a data spreading code specific to the satellite and carried by a carrier wave, and a pilot channel including a pilot spreading code specific to the satellite and carried by a carrier wave;

during the acquisition phase, the receiver being able to receive the navigation signal, called received signal transmitted by the satellite, to generate a local data signal including a local image of the data spreading code and a local image of the carrier wave, and to generate a local pilot signal including a local image of the pilot spreading code and the local image of the carrier wave;

the method being implemented after the acquisition phase during a convergence phase and comprising at least one of the following steps:

determining a plurality of periodic pilot channel correlations each corresponding to a periodic correlation on a reference interval of duration equal to a reference value between the received signal and the local pilot signal, and a plurality of periodic data channel correlations each corresponding to a periodic correlation on one of the reference intervals between the received signal and the local data signal, and determining a first value as a function of these periodic correlations;

determining a plurality of pilot channel partial correlations each corresponding to a periodic correlation on an interval of duration equal to a fraction of the reference value between the received signal and the local pilot signal, and determining a second value as a function of these partial correlations;

determining a plurality of shifted pilot channel correlations each corresponding to a shifted correlation on one of the reference intervals between the received signal and a shifted local signal corresponding to the local pilot signal in which the local image of the pilot spreading code is shifted by an integer number of reference units, and determining a third value as a function of these shifted pilot channel correlations;

the convergence phase further comprising the following step:

determining a wrong synchronization when at least one of the values among the first value, the second value and the third value, when such a value is determined, exceeds a predetermined threshold;

wherein the first value is determined based on covariances between the periodic pilot channel correlations and the periodic data channel correlations.

2. The method according to claim 1, wherein the first value is determined as follows:

$$v_1 = \frac{(P_{pp} - P_{dd})^2 + 4P_{pd}^2}{(P_{ref}/N)^2}\sigma^2,$$

where $v_1$ is the first value;

N is the number of pilot channel periodic correlations equal to the number of data channel periodic correlations;

$P_{pp}$ is the covariance of the pilot channel periodic correlations;

$P_{dd}$ is the covariance of the data channel periodic correlations;

$P_{pd}$ is the covariance of the pilot channel periodic correlations and the data channel periodic correlations;

$P_{ref}$ is a reference power determined as a function of the pilot channel periodic correlations; and $\sigma^2$ is the variance of the noise of $(P_{pp}-P_{dd})$ and $2P_{pd}$.

3. The method according to claim 1, wherein, during the step for determining a plurality of pilot channel partial correlations, P types of partial correlations are determined, a partial correlation of a given type being determined on a predetermined fraction of one of the reference intervals.

4. The method according to claim 3, wherein the second value is determined as follows:

$$v_2 = \frac{\text{Sum}_P}{P_{ref}}\sigma^2, \text{ where}$$

$$\text{Sum}_P = \sum_{p=1,\ldots,P}(I_{pp}(p) - M)^2,$$

$$M = \frac{1}{P}\sum_{p=1,\ldots,P}I_{pp}(p),$$

$$I_{pp}(p) = \frac{1}{N}\sum_{m=1,\ldots,N}\text{Re}[Z_{pp}(m, p)]\cdot\epsilon(m),$$

where $v_2$ is the second value;

N is the number of partial correlations;

$\epsilon(m)$ is the secondary code of the pilot channel 1 or −1;

$Z_{pp}(m, p)$ is a partial correlation of a type p, the number p being inclusively between 1 and $P_{ref}$ is a reference power determined as a function of the pilot channel periodic correlations;

Re[X] is the real part of a complex number X; and $\sigma^2$ is the variance of the noise of each of the functions $I_{pp}(p)$.

5. The method according to claim 1, wherein the second value is further determined as a function of a plurality of data channel partial correlations each corresponding to a periodic correlation over an interval of duration equal to a fraction of the reference value between the received signal and the local data signal.

6. The method according to claim 1, wherein each shifted pilot channel correlation is determined by using the local image of the pilot spreading code advanced or delayed by one or two reference units.

7. The method according to claim 1, wherein the third value is determined as follows:

$$v_3 = \frac{\sum_{k \in E}(I_{p+k}^2)}{P_{ref}}\sigma^2, \text{ where}$$

$$I_{p+k}(p) = \frac{1}{N}\sum_{m=1,\ldots,N} \text{Re}[Z_{pd}(m, kT_{chip})] \cdot \epsilon(m),$$

where $v_3$ is the third voltage,

N is the number of shifted correlations;

$\epsilon(m)$ is the secondary code of the pilot channel, its values being equal to 1 or −1;

E is a subset of the set $\{-K, \ldots, -1, 1, \ldots, K\}$, where K is the maximum number of shifts used in one direction;

$Z_{pd}(m, kT_{chip})$ is a correlation advanced by k reference units when k>0 and delayed by k reference units when k<0;

$P_{ref}$ is a reference power determined as a function of the pilot channel periodic correlations; and $\sigma^2$ is the variance of the noise of each of the functions $I_{p+k}(p)$.

8. The method according to claim 1, wherein at least two steps among the steps for determining a plurality of pilot channel periodic correlations, determining a plurality of pilot channel partial correlations and determining a plurality of shifted pilot channel correlations are carried out.

9. The method according to claim 8, wherein the method comprises carrying out all of said steps.

10. A computer program product comprising software instructions which, when implemented by a piece of computer equipment, carry out the method according to claim 1.

11. A receiver including a detection module configured to carry out the method according to claim 1.

* * * * *